Figure 1:
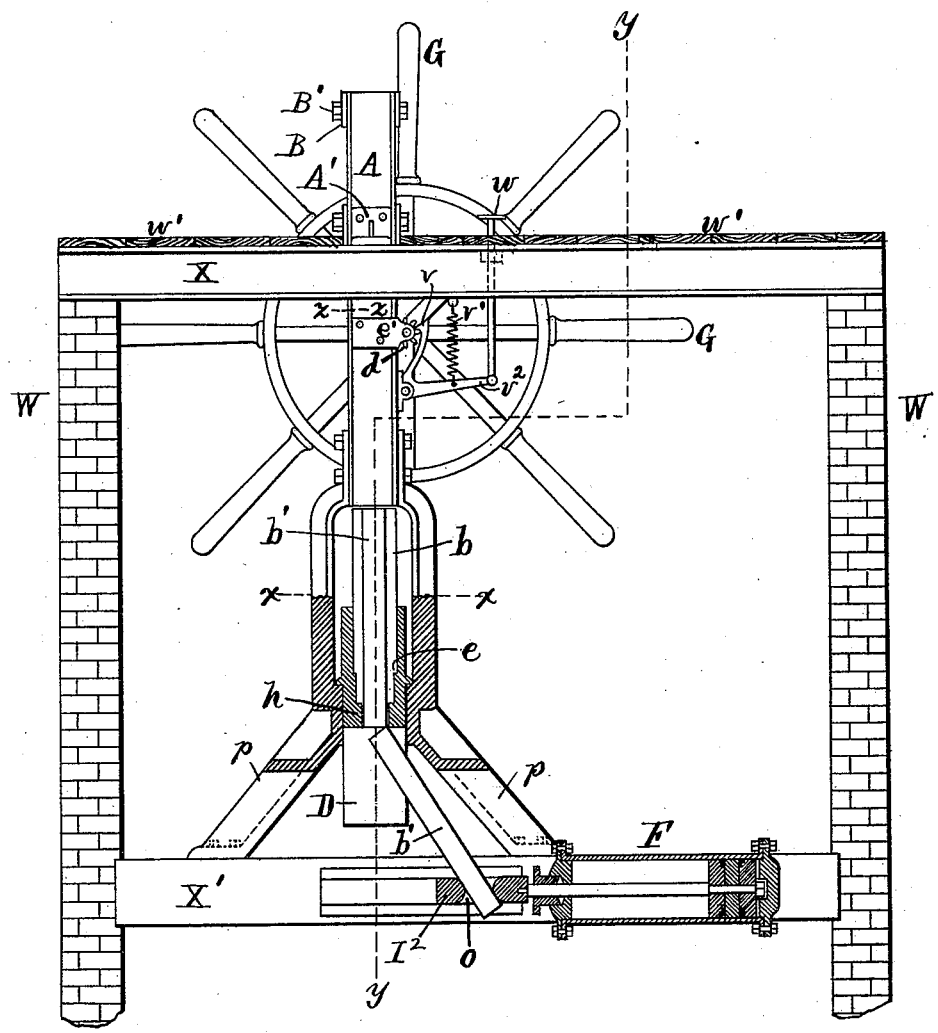

(No Model.) 2 Sheets—Sheet 1.

W. R. HINSDALE.
INGOT CASTING MACHINE.

No. 404,909. Patented June 11, 1889.

Attest:
L. Lee.
F. C. Fischer.

Inventor.
W. R. Hinsdale per
Crane & Miller, Attys.

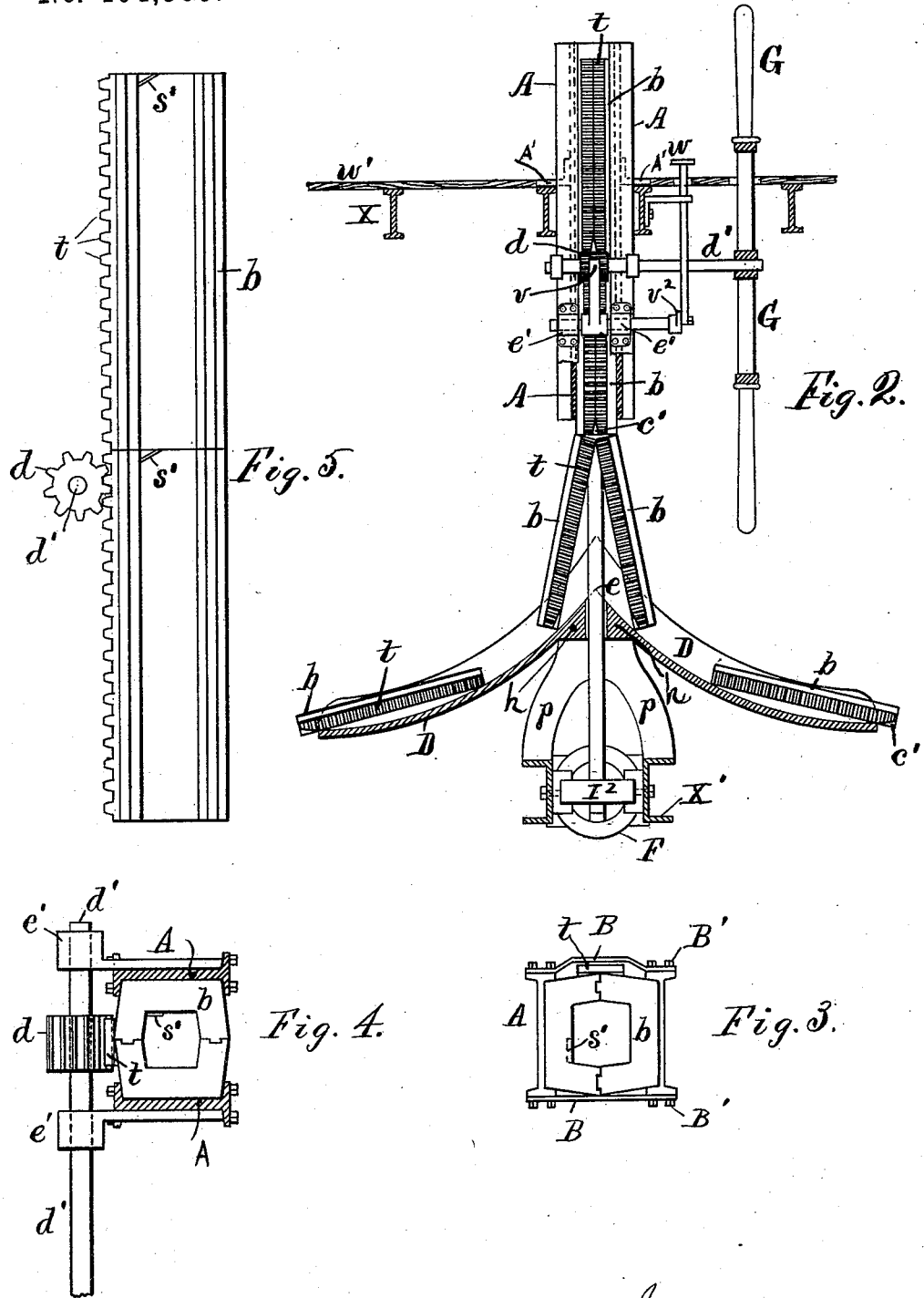

UNITED STATES PATENT OFFICE.

WILLIAM R. HINSDALE, OF HOBOKEN, NEW JERSEY.

INGOT-CASTING MACHINE.

SPECIFICATION forming part of Letters Patent No. 404,909, dated June 11, 1889.

Original application filed June 8, 1888, Serial No. 276,493. Divided and this application filed March 13, 1889. Serial No. 303,146. (No model.)

*To all whom it may concern:*

Be it known that I, WILLIAM R. HINSDALE, a citizen of the United States, residing at Hoboken, Hudson county, New Jersey, have invented certain new and useful Improvements in Ingot-Casting Machines, fully described and represented in the following specification and the accompanying drawings, forming a part of the same.

The machine illustrated herein is intended for use with a series of separate molds formed in longitudinal halves and applied in succession to a suitable holder. The contents of such mold-sections, being filled in succession as they are inclosed within the holder, form an ingot-bar, which may be separated into sections by means already well known.

The means for separating the halves of the mold and for breaking the ingot-bar are not claimed herein, as they are claimed in my copending application, Serial No. 276,493, filed June 8, 1888.

The object of the present invention is to furnish a means of moving the mold-sections positively downward within a holder formed of two channel-bars acting as guides to the opposite halves of the mold to hold them together during the casting operation; and the improvement consists in the combination, with a holder adapted to guide the molds, of a series of teeth formed upon the molds and a pinion applied to such teeth and rotated to push the molds downward in the holder.

In the drawings, Figure 1 is a side elevation of the apparatus, in vertical section (at the center line) below the dotted line $x\ x$. Fig. 2 is a vertical section on line $y\ y$ in Fig. 1. Fig. 3 is a plan of the holder with mold inclosed therein. Fig. 4 is a plan of the holder and the toothed pinion, the holder being shown in section on line $z\ z$ in Fig. 1; and Fig. 5 is an elevation of two half-mold sections and the pinion for lowering the same.

The holder may be made in any suitable manner, but is shown formed herein (see Fig. 3) of two wrought-iron I-bars A, bolted together by straps B, secured to the bars A by the bolts B'. The holder is secured by brackets A' between beams X, resting upon walls W, and a metallic frame $p$ is attached to the lower end of the holder and to other and lower beams X', sustained by the same walls.

The frame is provided with a socket $h$ to hold the bars during the breaking operation, and wedges or separators $e$ are formed upon the upper side of the socket to separate the mold parts when moved downward, and troughs D to receive the mold-sections when thus separated, as shown in Fig. 2.

Between the beams X' is shown a hydraulic cylinder F for actuating a head $I^2$, containing a socket $o$, through which the ingot-bar would be passed when moved downward to be broken into sections, as shown in Fig. 1.

The mold parts $b$, as shown in Figs. 2 and 5, are provided each with a rack or series of teeth $t$, and a toothed pinion $d$ is shown mounted upon a shaft fitted to bearings $e'$, attached to the holder near its upper end.

A pawl $v$, provided with a spring $v'$ to press it normally toward the pinion $d$, is pivoted upon the bars A A' and provided with an arm $v^2$, attached to a foot-presser $w$, extended above the floor $w'$ about the top of the holder.

The molds are shown divided longitudinally at their center line, and the rack-teeth are shown formed at each side of the parting-line upon both the mold parts with the pinion wide enough to engage with all of such teeth, and thus operate upon both parts of each mold with equal efficiency. The lower corners of the mold adjacent to the joint are beveled to form a notch $c'$, fitted to engage with the wedge $e$. The molds in Fig. 5 are shown provided near one upper corner with a diagonal rib or groove $s'$, adapted to engage the ingot-casting with the mold, so as to hold the mold parts and the ingot-bar $b'$ in the desired connection with one another until they are discharged from the apparatus.

The groove is shown in Fig. 3 cut in the side of the mold, and in Fig. 4 is shown the rib, both of which would perform the same function and prevent the mold from slipping longitudinally upon the ingot-bar when lowered beyond engagement with the pinion $d$.

The groove formed in the side of the ingot when the rib in the mold is used materially assists in the removal of a small piece from the corner of the ingot to display the appearance of the crystallization, and thus enable the operator to determine the grade of the steel. Two molds are shown inclosed in the holder in Fig. 2, the top end of the upper mold being drawn a little below the top of the holder to center another mold thereon. The two I-bars A hold the mold parts together and retain the molds in line with one another when filled with fluid metal, so that the molds may be moved downward without derangement by rotating the pinion-shaft $d'$. A hand-wheel G is shown applied to the shaft for such purpose.

The pinion is mounted upon the holder a little farther from the top of the holder than the length of a single mold, so that when the pinion is held from rotation and the first mold is inserted within the holder it is sustained by the contact of its rack-teeth with the teeth of the pinion. When such mold is filled and a succeeding empty mold is inserted, the pinion is retained in contact with the rack-teeth near the upper end of the filled mold, and therefore sustains the empty mold at a little higher point, as shown in Fig. 5.

The operation of the machine is as follows: A mold with a bottom is first inserted in the holder and sustained by the pinion $d$, the spring $v'$ operating the pawl to prevent the rotation of the pinion. The mold is then filled with fluid metal and another bottomless mold inserted within the holder on top of the same. The operator then grasps the hand-wheel G and retracts the pawl from the pinion by pressing upon the foot-plate $w$. The pinion being then released, the weight of the molds is sustained by the operator, who, by rotating the hand-wheel, lowers the fluid-mold nearly its entire length, retaining a hold upon the rack-teeth near the upper end of such mold, so as to sustain it in contact with the empty mold above it, as shown in Fig. 5. The empty mold, being then filled, is moved downward in a similar manner and an empty mold inserted above it. The operation of filling the empty mold, moving it downward, and inserting another in the top of the holder may then be repeated indefinitely, the halves of each mold being separated by the wedge $e$ and the mold parts thrown into the troughs D, while the ingot-bar is projected through the socket $h$ into the socket $o$ in the head $I^2$. The head would be reciprocated alternately with the downward movement of the molds, so as to break off the sections of the ingot-bar as fast as the same are formed. By combining the pinion $d$ with the holder and with the racks upon the molds the operation of filling the molds and lowering the same may be controlled with great ease and without the use of any complicated devices, such as have heretofore been used for such purpose.

Having thus set forth my invention, what I claim herein is—

1. In an ingot-casting machine, the combination, with a series of molds provided each with rack-teeth upon one side, of a holder adapted to guide and to sustain the molds, as described, and a toothed pinion mounted adjacent to such rack-teeth and adapted to engage with the teeth upon the molds to move the same downward in the holder, as and for the purpose set forth.

2. In an ingot-casting machine, the combination, with a series of molds each divided longitudinally, of teeth formed upon the mold parts adjacent to the dividing-line, and adapted, when the molds are butted together, to form a continuous rack, and a holder adapted to guide and to sustain the molds, as described, and a toothed pinion mounted upon the holder and adapted to engage with the teeth upon both parts of each mold to move the same downward in the holder, as and for the purpose set forth.

3. In an ingot-casting machine, the combination, with a series of molds provided each with rack-teeth upon one side, of a holder adapted to guide and to sustain the molds, as described, a toothed pinion mounted upon the holder and adapted to engage with the teeth upon the molds to move the same downward in the holder, and a pawl adapted to prevent the rotation of the pinion, as and for the purpose set forth.

4. In an ingot-casting machine, the combination, with a series of molds provided each with rack-teeth upon one side, of a holder adapted to guide and to sustain the molds, as described, a toothed pinion mounted upon the holder and adapted to engage with the teeth upon the molds to move the same downward in the holder, a pawl adapted to prevent the rotation of the pinion, and a weight or spring to hold the pawl in operation, and a presser to disengage the pawl, as and for the purpose set forth.

5. In an ingot-casting machine, the combination, with a series of molds each divided longitudinally and provided with rack-teeth, of a holder adapted to guide and sustain the molds, a separator below the holder for dividing the mold parts, and a toothed pinion mounted upon the holder and adapted to sustain the molds within the holder while being filled, and to force the molds downward upon the separator to divide the mold parts, substantially as herein set forth.

6. The means for preventing the slipping of the mold upon the ingot-bar, consisting in a projection and a groove formed in the two elements and operating to lock the mold and ingot together in the process of casting, substantially as herein set forth.

In testimony whereof I have hereunto set my hand in the presence of two subscribing witnesses.

WILLIAM R. HINSDALE.

Witnesses:
 THOS. S. CRANE,
 L. LEE.